US012775199B2

(12) United States Patent
Platner

(10) Patent No.: US 12,775,199 B2
(45) Date of Patent: Oct. 27, 2026

(54) IMAGE SENSOR AND LENS ASSEMBLY CONNECTOR MODULE

(71) Applicant: GoPro, Inc., San Mateo, CA (US)

(72) Inventor: David Thomas Platner, San Francisco, CA (US)

(73) Assignee: GoPro, Inc., San Mateo, CA (US)

( * ) Notice: Subject to any disclaimer, the term of this patent is extended or adjusted under 35 U.S.C. 154(b) by 361 days.

(21) Appl. No.: 18/440,048

(22) Filed: Feb. 13, 2024

(65) Prior Publication Data

US 2024/0345460 A1 Oct. 17, 2024

Related U.S. Application Data

(60) Provisional application No. 63/458,556, filed on Apr. 11, 2023.

(51) Int. Cl.

| | |
|---|---|
| ***G03B 17/56*** | (2021.01) |
| ***G03B 17/14*** | (2021.01) |
| ***H04N 23/53*** | (2023.01) |
| ***H04N 23/54*** | (2023.01) |
| ***H04N 23/55*** | (2023.01) |

(52) U.S. Cl.
CPC ........... *G03B 17/565* (2013.01); *G03B 17/14* (2013.01); *H04N 23/53* (2023.01); *H04N 23/54* (2023.01); *H04N 23/55* (2023.01)

(58) Field of Classification Search
CPC combination set(s) only.
See application file for complete search history.

(56) References Cited

U.S. PATENT DOCUMENTS

| | | | |
|---|---|---|---|
| 5,832,153 | A | 11/1998 | Duck |
| 6,215,924 | B1 | 4/2001 | Hulse |
| 7,139,473 | B2 | 11/2006 | Shimano |

(Continued)

FOREIGN PATENT DOCUMENTS

| | | | |
|---|---|---|---|
| CN | 101833157 | A | 9/2010 |
| WO | 2010037176 | A1 | 4/2010 |

OTHER PUBLICATIONS

International Search Report and Written Opinion for PCT/US2016/021269, May 17, 2016, 14 Pages.

(Continued)

*Primary Examiner* — Sinh Tran
*Assistant Examiner* — Zhenzhen wu
(74) *Attorney, Agent, or Firm* — Young Basile Hanlon & MacFarlane, P.C.

(57) ABSTRACT

An image capture device includes a first lens assembly, a first image sensor, a second lens assembly, and a second image sensor. The first image sensor is in communication with the first lens assembly forming a first integrated sensor and lens assembly (a first ISLA) that faces in a first direction. The second image sensor is in communication with the second lens assembly forming a second integrated sensor and lens assembly (a second ISLA) that faces in a second direction that is opposite the first direction. A lens mount that connects the first ISLA and the second ISLA together forming one or more stress-free zones. A first retention system that connect a first connector and a flexible connector in a first connection zone. A second retention system that connects a second connector and a second flexible connector in a second connection zone.

20 Claims, 9 Drawing Sheets

(56) References Cited

U.S. PATENT DOCUMENTS

| | | | |
|---|---|---|---|
| 7,190,389 | B1 | 3/2007 | Abe |
| 7,283,854 | B2 | 10/2007 | Sato |
| 7,397,511 | B2 | 7/2008 | Ezawa |
| 7,619,683 | B2 | 11/2009 | Davis |
| 7,626,612 | B2 | 12/2009 | John |
| 7,724,284 | B2 | 5/2010 | Mentzer |
| 7,856,180 | B2 | 12/2010 | Chishima |
| 7,859,588 | B2 | 12/2010 | Parulski |
| 7,961,234 | B2 | 6/2011 | Jarkko |
| 8,004,555 | B2 | 8/2011 | Oswald |
| 8,046,026 | B2 | 10/2011 | Koh |
| 8,149,327 | B2 | 4/2012 | Lin |
| 8,208,062 | B2 | 6/2012 | Lin |
| 8,451,312 | B2 | 5/2013 | Lee |
| 8,730,299 | B1 | 5/2014 | Kozko |
| 9,007,431 | B1 | 4/2015 | Kozko |
| 9,148,588 | B2 | 9/2015 | Jung |
| 9,185,279 | B2 | 11/2015 | Masuda |
| 9,197,885 | B2 | 11/2015 | Sun |
| 9,232,151 | B1 | 1/2016 | Azuma |
| 9,330,436 | B2 | 5/2016 | Macmillan |
| 9,332,167 | B1 | 5/2016 | Pance |
| 9,521,321 | B1 | 12/2016 | Kozko |
| 9,589,317 | B2 | 3/2017 | Ozaki |
| 9,754,159 | B2 | 9/2017 | Macmillan |
| 9,756,243 | B2 | 9/2017 | Shohara |
| 9,760,768 | B2 | 9/2017 | Macmillan |
| 9,977,226 | B2 | 5/2018 | Davies |
| 9,992,394 | B2 | 6/2018 | Abbas |
| 10,404,901 | B2 | 9/2019 | Abbas |
| 10,429,625 | B2 | 10/2019 | Davies |
| 10,462,442 | B2 | 10/2019 | Walker |
| 10,574,871 | B2 | 2/2020 | Abbas |
| 10,904,414 | B2 | 1/2021 | Abbas |
| 11,445,126 | B2 | 9/2022 | Cotoros |
| 2004/0021792 | A1 | 2/2004 | Yasui |
| 2004/0048633 | A1 | 3/2004 | Sato |
| 2005/0046740 | A1 | 3/2005 | Davis |
| 2005/0237424 | A1 | 10/2005 | Weekamp |
| 2006/0087751 | A1 | 4/2006 | Liu |
| 2006/0187560 | A1 | 8/2006 | Chou |
| 2007/0070204 | A1 | 3/2007 | Mentzer |
| 2007/0269205 | A1 | 11/2007 | Lee |
| 2007/0279482 | A1 | 12/2007 | Oswald |
| 2008/0064437 | A1 | 3/2008 | Chambers |
| 2008/0218611 | A1 | 9/2008 | Parulski |
| 2008/0218612 | A1 | 9/2008 | Border |
| 2009/0017867 | A1 | 1/2009 | Koh |
| 2009/0047995 | A1 | 2/2009 | Futter |
| 2009/0148149 | A1 | 6/2009 | Chishima |
| 2010/0045773 | A1 | 2/2010 | Ritchey |
| 2010/0072373 | A1 | 3/2010 | Nakajima |
| 2010/0165155 | A1 | 7/2010 | Chang |
| 2010/0231779 | A1 | 9/2010 | Lin |
| 2011/0164105 | A1 | 7/2011 | Lee |
| 2012/0019661 | A1 | 1/2012 | Thomson |
| 2012/0148192 | A1 | 6/2012 | Nakanishi |
| 2012/0274800 | A1 | 11/2012 | Vakil |
| 2013/0242040 | A1 | 9/2013 | Masuda |
| 2014/0168424 | A1 | 6/2014 | Attar |
| 2014/0192144 | A1 | 7/2014 | St. Clair |
| 2014/0218587 | A1 | 8/2014 | Shah |
| 2014/0267596 | A1 | 9/2014 | Geerds |
| 2015/0256746 | A1 | 9/2015 | Macmillan |
| 2015/0271483 | A1 | 9/2015 | Sun |
| 2015/0279038 | A1 | 10/2015 | Macmillan |
| 2016/0061954 | A1 | 3/2016 | Walsh |
| 2018/0020160 | A1* | 1/2018 | Lin ........................ H04N 23/45 |
| 2018/0042106 | A1* | 2/2018 | Scheja ................... H04N 23/54 |
| 2018/0262682 | A1* | 9/2018 | Wang ................... H04N 23/698 |
| 2020/0259978 | A1 | 8/2020 | Abbas |
| 2021/0111210 | A1* | 4/2021 | Vitale .................. G02B 3/0075 |
| 2022/0124230 | A1* | 4/2022 | Brookmire ............. G02B 7/005 |
| 2023/0224584 | A1* | 7/2023 | Stern ...................... G02B 15/10 348/208.6 |

OTHER PUBLICATIONS

International Search Report and Written Opinion for PCT/US2016/021269, May 17, 2016, 8 Pages.

* cited by examiner

IMAGE SENSOR AND LENS ASSEMBLY CONNECTOR MODULE

CROSS-REFERENCE TO RELATED APPLICATION(S)

This application claims priority to and the benefit of U.S. Provisional Application Patent Ser. No. 63/458,556, filed Apr. 11, 2023, the entire disclosures of which is hereby incorporated by reference.

TECHNICAL FIELD

This disclosure relates to an image module with one or more multiple image sensors and lens assemblies (ISLA) that are electrically connected to the camera using a connector module (e.g., a lens mount, a retention system).

BACKGROUND

Image capture devices have been created with one image sensor that captures images in a direction of the image sensor. Some image capture devices may include more than one image sensor that capture images in more than one direction. These multiple image sensors may capture image data to generate images around the image capture device. These image sensors may be located on opposing sides of the image capture device and captured images may be combined, such as by stitching, to form a single image.

SUMMARY

Disclosed herein are implementations of an image capture device including a first lens assembly, a first image sensor, a second lens assembly, and a second image sensor. The first lens assembly has a first area. The first image sensor in communication with the first lens assembly forms a first integrated sensor and lens assembly (a first ISLA), the first ISLA facing in a first direction. A first connector located on the first image sensor extends outside of the first area. A first flexible member having first a flexible connector aligns with the first connector so that a connection is formed between the first connector and the first flexible member to connect the first ISLA within the image capture device. The second lens assembly has a second area. The second image sensor in communication with the second lens assembly forms a second integrated sensor and lens assembly (a second ISLA), the second ISLA facing in a second direction that is opposite the first direction. A second connector located on the second image sensor extends outside of the second area. A second flexible member includes a second flexible connector that aligns with the second connector so that a connection is formed between the second connector and the second flexible connector to connect the second ISLA to the image capture device. A first retention system extends around the first connector of the first image sensor that extends outside of the first area of the first lens assembly and the flexible connector so that the first retention system maintains the connection between the first connector and the flexible connector. A second retention system extends around the second connector of the second image sensor that extends outside of the second area of the second lens assembly and the second flexible connector so that the second retention system maintains the connection between the second connector and the second flexible connector.

The present teachings provide: an image capture device including a first lens assembly, a first image sensor, a second lens assembly, and a second image sensor. A first image sensor in communication with the first lens assembly forming a first integrated sensor and lens assembly (a first ISLA), the first ISLA facing in a first direction. A first connector of the image sensor. A first retention system that extends around the first connector and a flexible connector. A second image sensor in communication with the second lens assembly forming a second integrated sensor and lens assembly (a second ISLA), the second ISLA facing in a second direction that is opposite the first direction. A second connector of the image sensor. A second retention system that extends around the second connector and a second flexible connector.

The present teachings provide: an image capture device comprising: a first lens assembly, a first image sensor, a second lens assembly, and a second image sensor. The first image sensor is in communication with the first lens assembly forming a first integrated sensor and lens assembly (a first ISLA) that faces in a first direction. The second image sensor is in communication with the second lens assembly forming a second integrated sensor and lens assembly (a second ISLA) that faces in a second direction that is opposite the first direction. A lens mount that connects the first ISLA and the second ISLA together forming one or more stress-free zones. A first retention system that connect a first connector and a flexible connector in a first connection zone. A second retention system that connects a second connector and a second flexible connector in a second connection zone.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The present teachings provide an image capture device with back-to-back image sensors. The image capture device includes a first integrated sensor and lens assembly (a first ISLA) that is back-to-back with a second integrated sensor and lens assembly (a second ISLA). The first ISLA and the second ISLA are coaxial. The first ISLA and the second ISLA are located within the image capture device in a low-profile manner. The first ISLA and the second ISLA are connected within the image capture device so that little to no stress is applied to the first ISLA, the second ISLA, or both. A lens mount assists in creating a first stress-free zone, a second stress-free zone, or both. The first stress-free zone may be associated with the first ISLA. The second stress-free zone may be associated with the second ISLA. The first ISLA may include a first connector and a first flexible connector. The second ISLA may include a second connector and a second flexible connector.

The first connector and the first flexible connector may be located outside of the first stress-free zone. The second connector and the second flexible connector may be located outside of the second stress-free zone. The first connector and the first flexible connector may be connected by a first retention system. The second connector and the second flexible connector may be connected by a second retention system. The first retention system, the second retention system, or both provide a force, create a connection zone, or both. By moving the first connector and the first flexible connector outside of the stress-free zone, a lower profile of the image capture device may be achieved while maintaining a secure connection. By moving the second connector and the second flexible connector outside of the stress-free zone, a lower profile of the image capture device may be created while maintaining a secure connection.

Figure 1A:
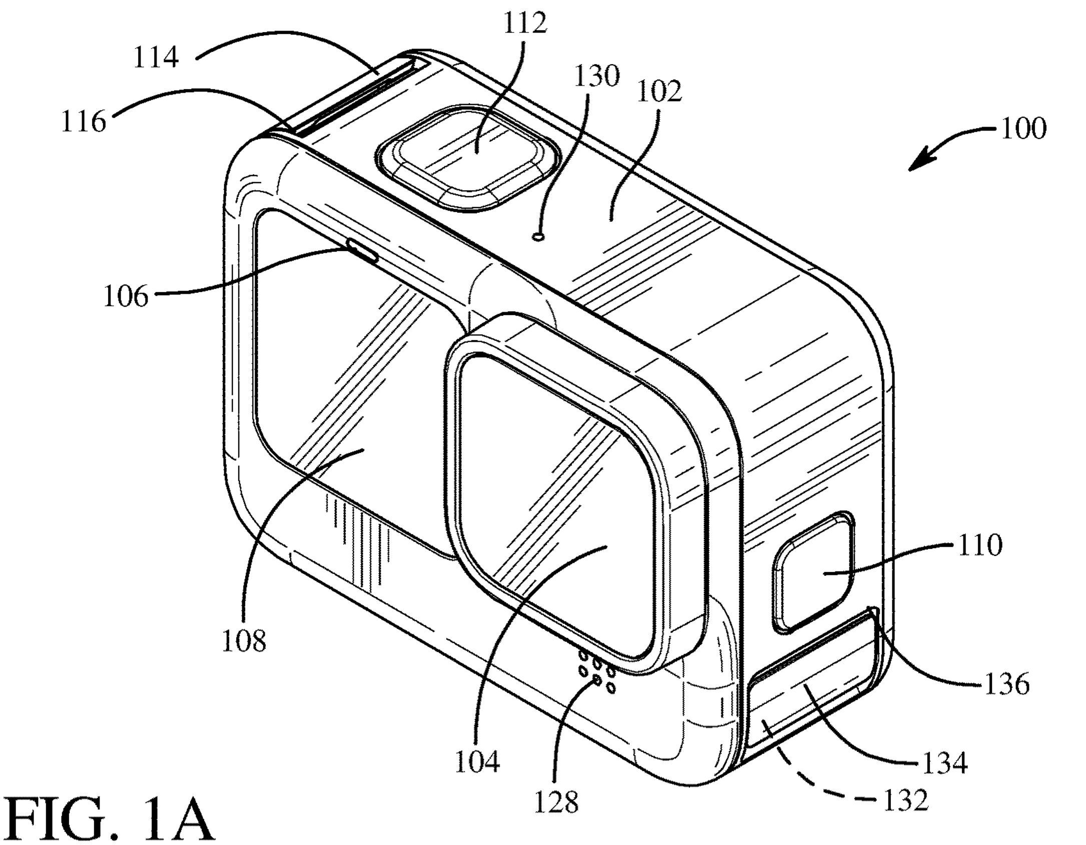
FIGS. 1A-1B are isometric views of an example of an image capture device.
Figure 1B:
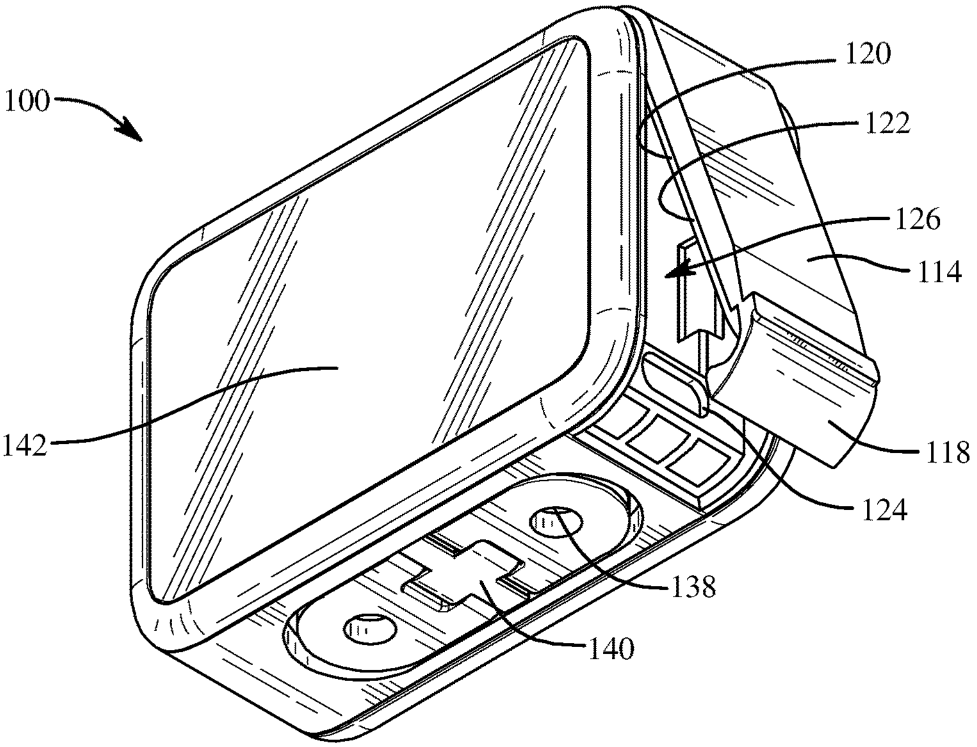
Figure 3:
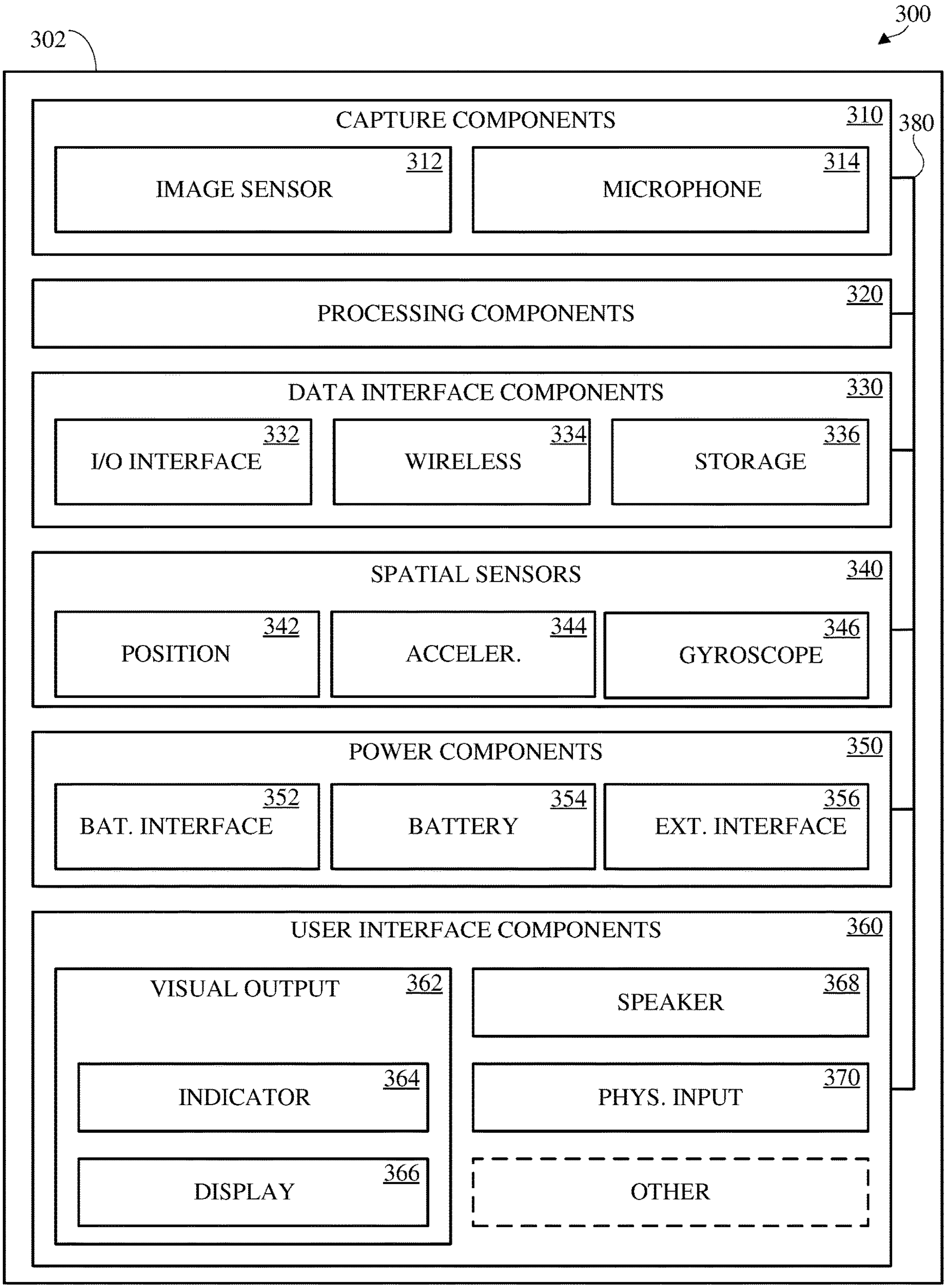
FIG. 3 is a block diagram of electronic components of an image capture device.

FIGS. 1A-1B are isometric views of an example of an image capture apparatus 100. The image capture apparatus 100 includes a body 102, an image capture device 104, an indicator 106, a display 108, a mode button 110, a shutter button 112, a door 114, a hinge mechanism 116, a latch mechanism 118, a seal 120, a battery interface 122, a data interface 124, a battery receptacle 126, microphones 128, 130, 132, a speaker 138, an interconnect mechanism 140, and a display 142. Although not expressly shown in FIGS. 1A-1B, the image capture apparatus 100 includes internal electronics, such as imaging electronics, power electronics, and the like, internal to the body 102 for capturing images and performing other functions of the image capture apparatus 100. An example showing internal electronics is shown in FIG. 3. The arrangement of the components of the image capture apparatus 100 shown in FIGS. 1A-1B is an example, other arrangements of elements may be used, except as is described herein or as is otherwise clear from context.

The body 102 of the image capture apparatus 100 may be made of a rigid material such as plastic, aluminum, steel, or fiberglass. Other materials may be used. The image capture device 104 is structured on a front surface of, and within, the body 102. The image capture device 104 includes a lens. The lens of the image capture device 104 receives light incident upon the lens of the image capture device 104 and directs the received light onto an image sensor of the image capture device 104 internal to the body 102. The image capture apparatus 100 may capture one or more images, such as a sequence of images, such as video. The image capture apparatus 100 may store the captured images and video for subsequent display, playback, or transfer to an external device. Although one image capture device 104 is shown in FIG. 1A, the image capture apparatus 100 may include multiple image capture devices, which may be structured on respective surfaces of the body 102.

As shown in FIG. 1A, the image capture apparatus 100 includes the indicator 106 structured on the front surface of the body 102. The indicator 106 may output, or emit, visible light, such as to indicate a status of the image capture apparatus 100. For example, the indicator 106 may be a light-emitting diode (LED). Although one indicator 106 is shown in FIG. 1A, the image capture apparatus 100 may include multiple indictors structured on respective surfaces of the body 102.

As shown in FIG. 1A, the image capture apparatus 100 includes the display 108 structured on the front surface of the body 102. The display 108 outputs, such as presents or displays, such as by emitting visible light, information, such as to show image information such as image previews, live video capture, or status information such as battery life, camera mode, elapsed time, and the like. In some implementations, the display 108 may be an interactive display, which may receive, detect, or capture input, such as user input representing user interaction with the image capture apparatus 100. In some implementations, the display 108 may be omitted or combined with another component of the image capture apparatus 100.

As shown in FIG. 1A, the image capture apparatus 100 includes the mode button 110 structured on a side surface of the body 102. Although described as a button, the mode button 110 may be another type of input device, such as a switch, a toggle, a slider, or a dial. Although one mode button 110 is shown in FIG. 1A, the image capture apparatus 100 may include multiple mode, or configuration, buttons structured on respective surfaces of the body 102. In some implementations, the mode button 110 may be omitted or combined with another component of the image capture apparatus 100. For example, the display 108 may be an interactive, such as touchscreen, display, and the mode button 110 may be physically omitted and functionally combined with the display 108.

As shown in FIG. 1A, the image capture apparatus 100 includes the shutter button 112 structured on a top surface of the body 102. The shutter button 112 may be another type of input device, such as a switch, a toggle, a slider, or a dial. The image capture apparatus 100 may include multiple shutter buttons structured on respective surfaces of the body 102. In some implementations, the shutter button 112 may be omitted or combined with another component of the image capture apparatus 100.

The mode button 110, the shutter button 112, or both, obtain input data, such as user input data in accordance with user interaction with the image capture apparatus 100. For example, the mode button 110, the shutter button 112, or both, may be used to turn the image capture apparatus 100 on and off, scroll through modes and settings, and select modes and change settings.

As shown in FIG. 1B, the image capture apparatus 100 includes the door 114 coupled to the body 102, such as using the hinge mechanism 116 (FIG. 1A). The door 114 may be secured to the body 102 using the latch mechanism 118 that releasably engages the body 102 at a position generally opposite the hinge mechanism 116. The door 114 includes the seal 120 and the battery interface 122. Although one door 114 is shown in FIG. 1A, the image capture apparatus 100 may include multiple doors respectively forming respective surfaces of the body 102, or portions thereof. The door 114 may be removable from the body 102 by releasing the latch mechanism 118 from the body 102 and decoupling the hinge mechanism 116 from the body 102.

In FIG. 1B, the door 114 is shown in a partially open position such that the data interface 124 is accessible for communicating with external devices and the battery receptacle 126 is accessible for placement or replacement of a battery. In FIG. 1A, the door 114 is shown in a closed position. In implementations in which the door 114 is in the closed position, the seal 120 engages a flange (not shown) to provide an environmental seal and the battery interface 122 engages the battery (not shown) to secure the battery in the battery receptacle 126.

As shown in FIG. 1B, the image capture apparatus 100 includes the battery receptacle 126 structured to form a portion of an interior surface of the body 102. The battery receptacle 126 includes operative connections for power transfer between the battery and the image capture apparatus 100. In some implementations, the battery receptable 126 may be omitted. The image capture apparatus 100 may include multiple battery receptacles.

As shown in FIG. 1A, the image capture apparatus 100 includes a first microphone 128 structured on a front surface of the body 102, a second microphone 130 structured on a top surface of the body 102, and a third microphone 132 structured on a side surface of the body 102. The third microphone 132, which may be referred to as a drain microphone and is indicated as hidden in dotted line, is located behind a drain cover 134, surrounded by a drain channel 136, and can drain liquid from audio components of the image capture apparatus 100. The image capture apparatus 100 may include other microphones on other surfaces of the body 102. The microphones 128, 130, 132 receive and record audio, such as in conjunction with capturing video or separate from capturing video. In some implementations, one or more of the microphones 128, 130, 132 may be omitted or combined with other components of the image capture apparatus 100.

As shown in FIG. 1B, the image capture apparatus 100 includes the speaker 138 structured on a bottom surface of the body 102. The speaker 138 outputs or presents audio, such as by playing back recorded audio or emitting sounds associated with notifications. The image capture apparatus 100 may include multiple speakers structured on respective surfaces of the body 102.

As shown in FIG. 1B, the image capture apparatus 100 includes the interconnect mechanism 140 structured on a bottom surface of the body 102. The interconnect mechanism 140 removably connects the image capture apparatus 100 to an external structure, such as a handle grip, another mount, or a securing device. The interconnect mechanism 140 includes folding protrusions configured to move between a nested or collapsed position as shown in FIG. 1B and an extended or open position. The folding protrusions of the interconnect mechanism 140 in the extended or open position may be coupled to reciprocal protrusions of other devices such as handle grips, mounts, clips, or like devices. The image capture apparatus 100 may include multiple interconnect mechanisms structured on, or forming a portion of, respective surfaces of the body 102. In some implementations, the interconnect mechanism 140 may be omitted.

As shown in FIG. 1B, the image capture apparatus 100 includes the display 142 structured on, and forming a portion of, a rear surface of the body 102. The display 142 outputs, such as presents or displays, such as by emitting visible light, data, such as to show image information such as image previews, live video capture, or status information such as battery life, camera mode, elapsed time, and the like. In some implementations, the display 142 may be an interactive display, which may receive, detect, or capture input, such as user input representing user interaction with the image capture apparatus 100. The image capture apparatus 100 may include multiple displays structured on respective surfaces of the body 102, such as the displays 108, 142 shown in FIGS. 1A-1B. In some implementations, the display 142 may be omitted or combined with another component of the image capture apparatus 100.

The image capture apparatus 100 may include features or components other than those described herein, such as other buttons or interface features. In some implementations, interchangeable lenses, cold shoes, and hot shoes, or a combination thereof, may be coupled to or combined with the image capture apparatus 100. For example, the image capture apparatus 100 may communicate with an external device, such as an external user interface device, via a wired or wireless computing communication link, such as via the data interface 124. The computing communication link may be a direct computing communication link or an indirect computing communication link, such as a link including another device or a network, such as the Internet. The image capture apparatus 100 may transmit images to the external device via the computing communication link.

The external device may store, process, display, or combination thereof, the images. The external user interface device may be a computing device, such as a smartphone, a tablet computer, a smart watch, a portable computer, personal computing device, or another device or combination of devices configured to receive user input, communicate information with the image capture apparatus 100 via the computing communication link, or receive user input and communicate information with the image capture apparatus 100 via the computing communication link. The external user interface device may implement or execute one or more applications to manage or control the image capture apparatus 100. For example, the external user interface device may include an application for controlling camera configuration, video acquisition, video display, or any other configurable or controllable aspect of the image capture apparatus 100. In some implementations, the external user interface device may generate and share, such as via a cloud-based or social media service, one or more images or video clips. In some implementations, the external user interface device may display unprocessed or minimally processed images or video captured by the image capture apparatus 100 contemporaneously with capturing the images or video by the image capture apparatus 100, such as for shot framing or live preview.

Figure 2A:
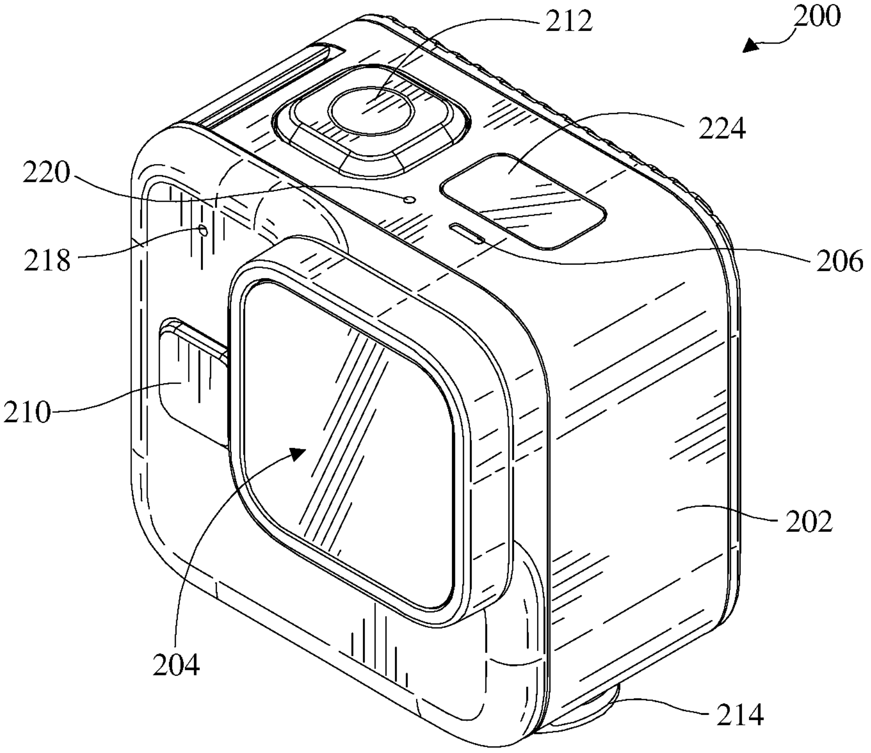
FIGS. 2A-2B are isometric views of an example of an image capture device.
Figure 2B:
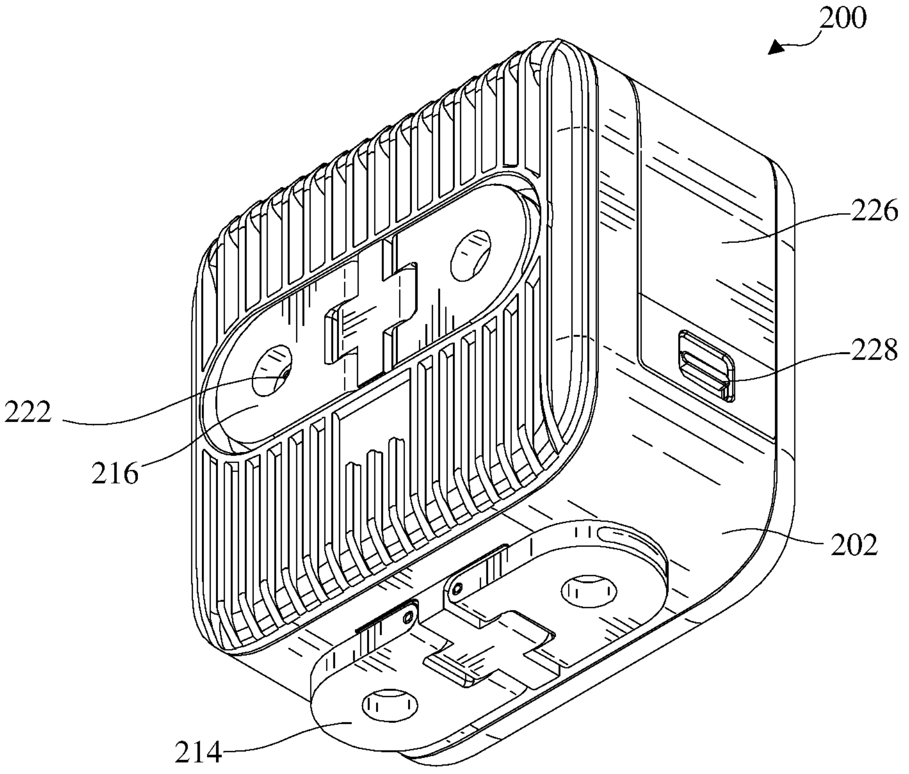

FIGS. 2A-2B illustrate another example of an image capture apparatus 200. The image capture apparatus 200 is similar to the image capture apparatus 100 shown in FIGS. 1A-1B. The image capture apparatus 200 includes a body 202, an image capture device 204, an indicator 206, a mode button 210, a shutter button 212, interconnect mechanisms 214, 216, audio components 218, 220, 222, a display 224, and a door 226 including a release mechanism 228. The arrangement of the components of the image capture apparatus 300 shown in FIG. 3 is an example, other arrangements of elements may be used.

The body 202 of the image capture apparatus 200 may be similar to the body 102 shown in FIGS. 1A-1B. The image capture device 204 is structured on a front surface of the body 202. The image capture device 404 includes a lens and may be similar to the image capture device 104 shown in FIG. 1A.

As shown in FIG. 2A, the image capture apparatus 200 includes the indicator 206 on a top surface of the body 202. The indicator 206 may be similar to the indicator 106 shown in FIG. 1A. The indicator 206 may indicate a status of the image capture device 204. Although one indicator 206 is shown in FIGS. 2A, the image capture apparatus 200 may include other indictors structured on respective surfaces of the body 202.

As shown in FIGS. 2A, the image capture apparatus 200 includes input mechanisms including the mode button 210, structured on a front surface of the body 202, and the shutter button 212, structured on a top surface of the body 202. The mode button 210 may be similar to the mode button 110 shown in FIG. 1B. The shutter button 212 may be similar to the shutter button 112 shown in FIG. 1A.

The image capture apparatus 200 includes internal electronics (not expressly shown), such as imaging electronics, power electronics, and the like, internal to the body 202 for capturing images and performing other functions of the image capture apparatus 200. An example showing internal electronics is shown in FIG. 3.

As shown in FIGS. 2A-2B, the image capture apparatus 200 includes the interconnect mechanisms 214, 216, with a first interconnect mechanism 214 structured on a bottom surface of the body 202 and a second interconnect mechanism 216 disposed within a rear surface of the body 202. The interconnect mechanisms 214, 216 may be similar to the interconnect mechanism 140 shown in FIG. 1B.

As shown in FIGS. 2A-2B, the image capture apparatus 200 includes the audio components 218, 220, 222 respectively structured on respective surfaces of the body 202. The audio components 218, 220, 222 may be similar to the microphones 128, 130, 132 and the speaker 138 shown in FIGS. 1A-1B. One or more of the audio components 218, 220, 222 may be, or may include, audio sensors, such as microphones, to receive and record audio signals, such as voice commands or other audio, in conjunction with capturing images or video. One or more of the audio components 218, 220, 222 may be, or may include, an audio presentation component that may present, or play, audio, such as to provide notifications or alerts.

As shown in FIGS. 2A-2B, a first audio component 218 is located on a front surface of the body 202, a second audio component 220 is located on a top surface of the body 202, and a third audio component 222 is located on a rear surface of the body 202. Other numbers and configurations for the audio components 218, 220, 222 may be used.

As shown in FIG. 2A, the image capture apparatus 200 includes the display 224 structured on a front surface of the body 202. The display 224 may be similar to the displays 108, 142 shown in FIGS. 1A-1B. The display 224 may include an I/O interface. The display 224 may receive touch inputs. The display 224 may display image information during video capture. The display 224 may provide status information to a user, such as status information indicating battery power level, memory card capacity, time elapsed for a recorded video, etc. The image capture apparatus 200 may include multiple displays structured on respective surfaces of the body 202. In some implementations, the display 224 may be omitted or combined with another component of the image capture apparatus 100.

As shown in FIG. 2B, the image capture apparatus 200 includes the door 226 structured on, or forming a portion of, the side surface of the body 202. The door 226 may be similar to the door 126 shown in FIG. 1B. The door 226 shown in FIG. 2B includes the release mechanism 228. The release mechanism 228 may include a latch, a button, or other mechanism configured to receive a user input that allows the door 226 to change position. The release mechanism 228 may be used to open the door 226 for a user to access a battery, a battery receptacle, an I/O interface, a memory card interface, etc.

In some embodiments, the image capture apparatus 200 may include features or components other than those described herein, some features or components described herein may be omitted, or some features or components described herein may be combined. For example, the image capture apparatus 200 may include additional interfaces or different interface features, interchangeable lenses, cold shoes, or hot shoes.

FIG. 3 is a block diagram of electronic components in an image capture apparatus 300. The image capture apparatus 300 may be a single-lens image capture device, a multi-lens image capture device, or variations thereof, including an image capture apparatus with multiple capabilities such as the use of interchangeable integrated sensor and lens assembly. Components, such as electronic components, of the image capture apparatus 100 shown in FIGS. 1A-B, the image capture apparatus 200 shown in FIGS. 2A-B, or the image capture apparatus 400 of FIG. 4, may be implemented as shown in FIG. 3.

The image capture apparatus 300 includes a body 302. The body 302 may be similar to the body 102 shown in FIGS. 1A-1B or the body 202 shown in FIGS. 2A-2B. The body 302 includes electronic components such as capture components 310, processing components 320, data interface components 330, spatial sensors 340, power components 350, user interface components 360, and a bus 380.

The capture components 310 include an image sensor 312 for capturing images. Although one image sensor 312 is shown in FIG. 3, the capture components 310 may include multiple image sensors. The image sensor 312 may be similar to the image sensors 242, 246 shown in FIG. 2. The image sensor 312 may be, for example, a charge-coupled device (CCD) sensor, an active pixel sensor (APS), a complementary metal-oxide-semiconductor (CMOS) sensor, or an N-type metal-oxide-semiconductor (NMOS) sensor. The image sensor 312 detects light, such as within a defined spectrum, such as the visible light spectrum or the infrared spectrum. The image sensor 312 captures detected light as image data and conveys the captured image data as electrical signals (image signals or image data) to the other components of the image capture apparatus 300, such as to the processing components 320, such as via the bus 380.

The capture components 310 include a microphone 314 for capturing audio. Although one microphone 314 is shown in FIG. 3, the capture components 310 may include multiple microphones. The microphone 314 detects and captures, or records, sound, such as sound waves incident upon the microphone 314. The microphone 314 may detect, capture, or record sound in conjunction with capturing images by the image sensor 312. The microphone 314 may detect sound to receive audible commands to control the image capture apparatus 300. The microphone 314 may be similar to the microphones 128, 130, 132 shown in FIGS. 1A-1B or the audio components 218, 220, 222 shown in FIGS. 2A-2B.

The processing components 320 perform image signal processing, such as filtering, tone mapping, or stitching, to generate, or obtain, processed images, or processed image data, based on image data obtained from the image sensor 312. The processing components 320 may include one or more processors having single or multiple processing cores. In some implementations, the processing components 320 may include, or may be, an application specific integrated circuit (ASIC) or a digital signal processor (DSP). For example, the processing components 320 may include a custom image signal processor. The processing components 320 conveys data, such as processed image data, with other components of the image capture apparatus 300 via the bus 380. In some implementations, the processing components 320 may include an encoder, such as an image or video encoder that may encode, decode, or both, the image data, such as for compression coding, transcoding, or a combination thereof.

Although not shown expressly in FIG. 3, the processing components 320 may include memory, such as a random-access memory (RAM) device, which may be non-transitory computer-readable memory. The memory of the processing components 320 may include executable instructions and data that can be accessed by the processing components 320.

The data interface components 330 communicates with other, such as external, electronic devices, such as a remote control, a smartphone, a tablet computer, a laptop computer, a desktop computer, or an external computer storage device. For example, the data interface components 330 may receive commands to operate the image capture apparatus 300. In another example, the data interface components 330 may transmit image data to transfer the image data to other electronic devices. The data interface components 330 may be configured for wired communication, wireless communication, or both. As shown, the data interface components 330 include an I/O interface 332, a wireless data interface 334, and a storage interface 336. In some implementations, one or more of the I/O interface 332, the wireless data interface 334, or the storage interface 336 may be omitted or combined.

The I/O interface 332 may send, receive, or both, wired electronic communications signals. For example, the I/O interface 332 may be a universal serial bus (USB) interface, such as USB type-C interface, a high-definition multimedia interface (HDMI), a FireWire interface, a digital video interface link, a display port interface link, a Video Electronics Standards Associated (VESA) digital display interface link, an Ethernet link, or a Thunderbolt link. Although one I/O interface 332 is shown in FIG. 3, the data interface components 330 include multiple I/O interfaces. The I/O interface 332 may be similar to the data interface 124 shown in FIG. 1B.

The wireless data interface 334 may send, receive, or both, wireless electronic communications signals. The wireless data interface 334 may be a Bluetooth interface, a ZigBee interface, a Wi-Fi interface, an infrared link, a cellular link, a near field communications (NFC) link, or an Advanced Network Technology interoperability (ANT+) link. Although one wireless data interface 334 is shown in FIG. 3, the data interface components 330 include multiple wireless data interfaces. The wireless data interface 334 may be similar to the data interface 124 shown in FIG. 1B.

The storage interface 336 may include a memory card connector, such as a memory card receptacle, configured to receive and operatively couple to a removable storage device, such as a memory card, and to transfer, such as read, write, or both, data between the image capture apparatus 300 and the memory card, such as for storing images, recorded audio, or both captured by the image capture apparatus 300 on the memory card. Although one storage interface 336 is shown in FIG. 3, the data interface components 330 include multiple storage interfaces. The storage interface 336 may be similar to the data interface 124 shown in FIG. 1B.

The spatial, or spatiotemporal, sensors 340 detect the spatial position, movement, or both, of the image capture apparatus 300. As shown in FIG. 3, the spatial sensors 340 include a position sensor 342, an accelerometer 344, and a gyroscope 346. The position sensor 342, which may be a global positioning system (GPS) sensor, may determine a geospatial position of the image capture apparatus 300, which may include obtaining, such as by receiving, temporal data, such as via a GPS signal. The accelerometer 344, which may be a three-axis accelerometer, may measure linear motion, linear acceleration, or both of the image capture apparatus 300. The gyroscope 346, which may be a three-axis gyroscope, may measure rotational motion, such as a rate of rotation, of the image capture apparatus 300. In some implementations, the spatial sensors 340 may include other types of spatial sensors. In some implementations, one or more of the position sensor 342, the accelerometer 344, and the gyroscope 346 may be omitted or combined.

The power components 350 distribute electrical power to the components of the image capture apparatus 300 for operating the image capture apparatus 300. As shown in FIG. 3, the power components 350 include a battery interface 352, a battery 354, and an external power interface 356 (ext. interface). The battery interface 352 (bat. interface) operatively couples to the battery 354, such as via conductive contacts to transfer power from the battery 354 to the other electronic components of the image capture apparatus 300. The battery interface 352 may be similar to the battery receptacle 126 shown in FIG. 1B. The external power interface 356 obtains or receives power from an external source, such as a wall plug or external battery, and distributes the power to the components of the image capture apparatus 300, which may include distributing power to the battery 354 via the battery interface 352 to charge the battery 354. Although one battery interface 352, one battery 354, and one external power interface 356 are shown in FIG. 3, any number of battery interfaces, batteries, and external power interfaces may be used. In some implementations, one or more of the battery interface 352, the battery 354, and the external power interface 356 may be omitted or combined. For example, in some implementations, the external power interface 356 and the I/O interface 332 may be combined.

The user interface components 360 receive input, such as user input, from a user of the image capture apparatus 300, output, such as display or present, information to a user, or both receive input and output information, such as in accordance with user interaction with the image capture apparatus 300.

As shown in FIG. 3, the user interface components 360 include visual output components 362 to visually communicate information, such as to present captured images. As shown, the visual output components 362 include an indicator 364 and a display 366. The indicator 364 may be similar to the indicator 106 shown in FIG. 1A. The display 366 may be similar to the display 108 shown in FIG. 1A and the display 142 shown in FIG. 1B. Although the visual output components 362 are shown in FIG. 3 as including one indicator 364, the visual output components 362 may include multiple indicators. Although the visual output components 362 are shown in FIG. 3 as including one display 366, the visual output components 362 may include multiple displays. In some implementations, one or more of the indicator 364 or the display 366 may be omitted or combined.

As shown in FIG. 3, the user interface components 360 include a speaker 368. The speaker 368 may be similar to the speaker 138 shown in FIG. 1B, the audio components 218, 220 shown in FIGS. 2A-2B. Although one speaker 368 is shown in FIG. 3, the user interface components 360 may include multiple speakers. In some implementations, the speaker 368 may be omitted or combined with another component of the image capture apparatus 300, such as the microphone 314.

As shown in FIG. 3, the user interface components 360 include a physical input interface 370. The physical input interface 370 may be similar to the mode buttons 110, 210, 410 shown in FIGS. 1A-2A or the shutter buttons 112, 212 shown in FIGS. 1A and 2A. Although one physical input interface 370 is shown in FIG. 3, the user interface components 360 may include multiple physical input interfaces. In some implementations, the physical input interface 370 may be omitted or combined with another component of the image capture apparatus 300. The physical input interface 370 may be, for example, a button, a toggle, a switch, a dial, or a slider.

As shown in FIG. 3, the user interface components 360 include a broken line border box labeled "other" to indicate that components of the image capture apparatus 300 other than the components expressly shown as included in the user interface components 360 may be user interface components. For example, the microphone 314 may receive, or capture, and process audio signals to obtain input data, such as user input data corresponding to voice commands. In another example, the image sensor 312 may receive, or capture, and process image data to obtain input data, such as user input data corresponding to visible gesture commands. In another example, one or more of the spatial sensors 340, such as a combination of the accelerometer 344 and the gyroscope 346, may receive, or capture, and process motion data to obtain input data, such as user input data corresponding to motion gesture commands.

Figure 4:
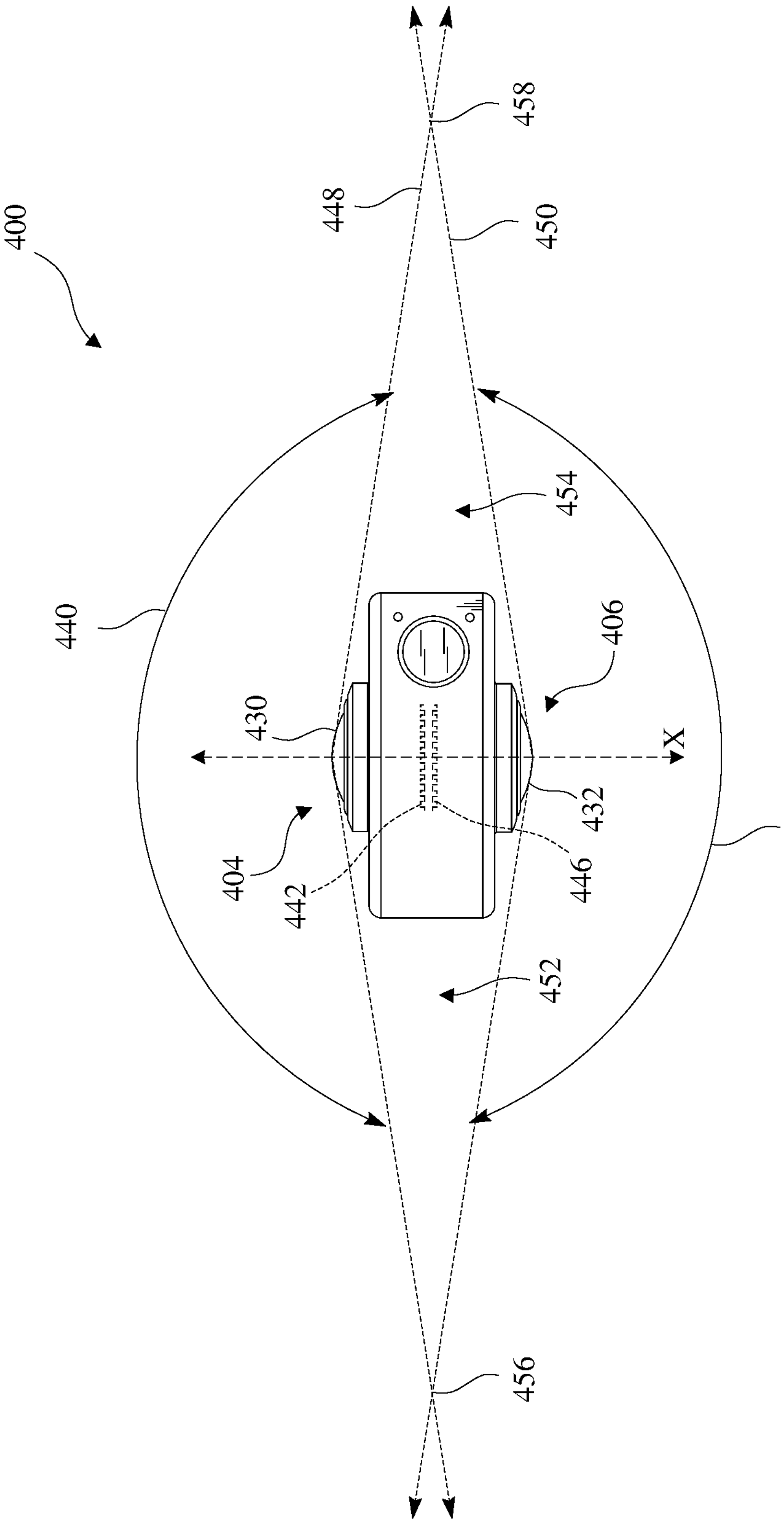
FIG. 4 is a top view of an image capture device.

FIG. 4 is a top view of an image capture apparatus 400. The image capture apparatus 400 is similar to the image capture apparatus 100 of FIGS. 1A-1B and the image capture apparatus 200 of FIGS. 2A-2B and is configured to capture spherical images.

As shown in FIG. 4, a first image capture device 404 includes a first lens 430 and a second image capture device 406 includes a second lens 432. For example, the first image capture device 404 may capture a first image, such as a first hemispheric, or hyper-hemispherical, image, the second image capture device 406 may capture a second image, such as a second hemispheric, or hyper-hemispherical, image, and the image capture apparatus 400 may generate a spherical image incorporating or combining the first image and the second image, which may be captured concurrently, or substantially concurrently.

The first image capture device 404 defines a first field-of-view 440 wherein the first lens 430 of the first image capture device 404 receives light. The first lens 430 directs the received light corresponding to the first field-of-view 440 onto a first image sensor 442 of the first image capture device 404. For example, the first image capture device 404 may include a first lens barrel (not expressly shown), extending from the first lens 430 to the first image sensor 442.

The second image capture device 406 defines a second field-of-view 444 wherein the second lens 432 receives light. The second lens 432 directs the received light corresponding to the second field-of-view 444 onto a second image sensor 446 of the second image capture device 406. For example, the second image capture device 406 may include a second lens barrel (not expressly shown), extending from the second lens 432 to the second image sensor 446.

A boundary 448 of the first field-of-view 440 is shown using broken directional lines. A boundary 450 of the second field-of-view 444 is shown using broken directional lines. As shown, the image capture devices 404, 406 are arranged in a back-to-back (Janus) configuration such that the lenses 430, 432 face in opposite directions, and such that the image capture apparatus 400 may capture spherical images. The first image sensor 442 captures a first hyper-hemispherical image plane from light entering the first lens 430. The second image sensor 446 captures a second hyper-hemispherical image plane from light entering the second lens 432.

As shown in FIG. 4, the fields-of-view 440, 444 partially overlap such that the combination of the fields-of-view 440, 444 forms a spherical field-of-view, except that one or more uncaptured areas 452, 454 may be outside of the fields-of-view 440, 444 of the lenses 430, 432. Light emanating from or passing through the uncaptured areas 452, 454, which may be proximal to the image capture apparatus 400, may be obscured from the lenses 430, 432 and the corresponding image sensors 442, 446, such that content corresponding to the uncaptured areas 452, 454 may be omitted from images captured by the image capture apparatus 400. In some implementations, the image capture devices 404, 406, or the lenses 430, 432 thereof, may be configured to minimize the uncaptured areas 452, 454.

Examples of points of transition, or overlap points, from the uncaptured areas 452, 454 to the overlapping portions of the fields-of-view 440, 444 are shown at 456, 458.

Images contemporaneously captured by the respective image sensors 442, 446 may be combined to form a combined image, such as a spherical image. Generating a combined image may include correlating the overlapping regions captured by the respective image sensors 442, 446, aligning the captured fields-of-view 440, 444, and stitching the images together to form a cohesive combined image. Stitching the images together may include correlating the overlap points 456, 458 with respective locations in corresponding images captured by the image sensors 442, 446. Although a planar view of the fields-of-view 440, 444 is shown in FIG. 4, the fields-of-view 440, 444 are hyper-hemispherical.

A change in the alignment, such as position, tilt, or a combination thereof, of the image capture devices 404, 406, such as of the lenses 430, 432, the image sensors 442, 446, or both, may change the relative positions of the respective fields-of-view 440, 444, may change the locations of the overlap points 456, 458, such as with respect to images captured by the image sensors 442, 446, and may change the uncaptured areas 452, 454, which may include changing the uncaptured areas 452, 454 unequally.

Incomplete or inaccurate information indicating the alignment of the image capture devices 404, 406, such as the locations of the overlap points 456, 458, may decrease the accuracy, efficiency, or both of generating a combined image. In some implementations, the image capture apparatus 400 may maintain information indicating the location and orientation of the image capture devices 404, 406, such as of the lenses 430, 432, the image sensors 442, 446, or both, such that the fields-of-view 440, 444, the overlap points 456, 458, or both may be accurately determined, which may improve the accuracy, efficiency, or both of generating a combined image.

The lenses 430, 432 may be aligned along an axis X as shown, laterally offset (e.g., lateral direction) from each other (not shown), off-center from a central axis of the image capture apparatus 400 (not shown), or laterally offset and off-center from the central axis (not shown). Whether through use of offset or through use of compact image capture devices 404, 406, a reduction in distance between the lenses 430, 432 along the axis X may improve the overlap in the fields-of-view 440, 444, such as by reducing the uncaptured areas 452, 454.

Images or frames captured by the image capture devices 404, 406 may be combined, merged, or stitched together to produce a combined image, such as a spherical or panoramic image, which may be an equirectangular planar image. In some implementations, generating a combined image may include use of techniques such as noise reduction, tone mapping, white balancing, or other image correction. In some implementations, pixels along a stitch boundary, which may correspond with the overlap points 456, 458, may be matched accurately to minimize boundary discontinuities.

Figure 5A:
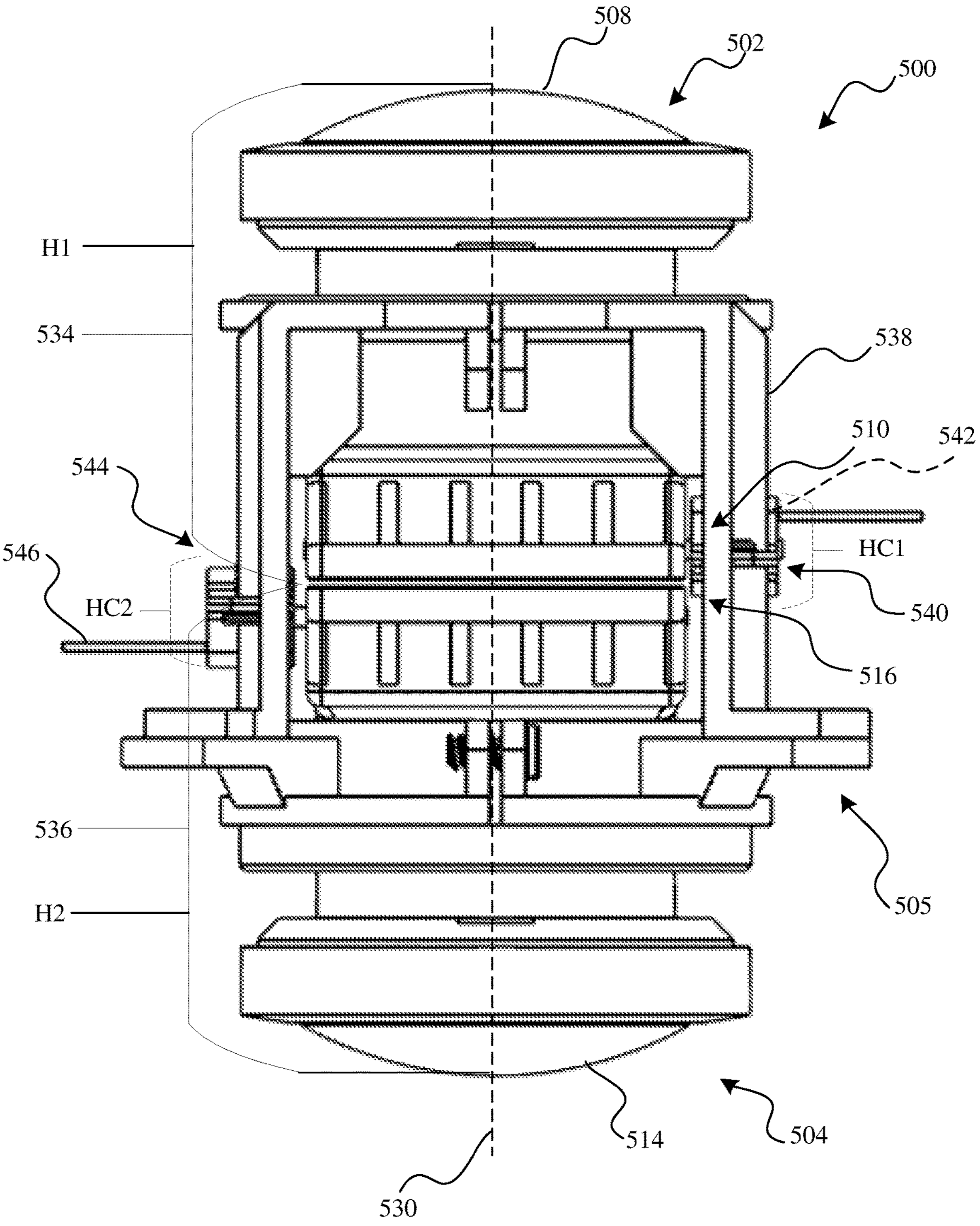
FIG. 5A is a plan view of the image sensors and lens assemblies of FIG. 4 removed from the image capture device and connected by a connector module.

FIG. 5A is shows an interior plan view of the image capture apparatus 400 from FIG. 4. An image capture device 500 has a first image capture device 502 and a second image capture device 504 in a back-to-back configuration. The first image capture device 502 and the second image capture device 504 are co-axial along an optical axis 530. The first image capture device 502 and the second image capture device 504 may be decoupled relative to one another, free of stress relative to one another, or both. The first image capture device 502 and the second image capture device 504 may be connected by a connector module 505. The first image capture device 502 includes a first integrated sensor and lens assembly (ISLA) 534 having a first height (H1). The second image capture device 504 includes a second integrated sensor and lens assembly (ISLA) 536 having a second height (H2). The first height (H1) and the second height (H2) in the example in FIG. 5A are substantially equal. The connector module 505 assists in aligning the first image capture device 502 and the second image capture device 504 via the lens mount 538.

A lens mount 538 extends around a portion of the first ISLA 534 and a portion of the second ISLA 536. The lens mount 538 retains the first ISLA 534 and the second ISLA 536 spatially apart in a secure manner relative to one another. A first image sensor 510 is located at and forms a rear of the first ISLA 534 and is adjacent to a second image sensor 516 that is located at and forms a rear of the second ISLA 536. The lens mount 538 restricts movement of the first image sensor 510 relative to the second image sensor 516. A first retention system 540 and a first connector 542 extend out of a first side of the lens mount 538. A second retention system 544 and a second connector 546 extend out of a second side of the lens mount 538. As shown, the first side and the second side are opposite one another in respect to the optical axis 530. The first retention system 540 assists in maintaining a connection with the first connector 542. The second retention system 544 assists in maintaining a connection with the second connector 546. The connector module 505 may further include the first retention system 540, the second retention system 544, or both.

The first retention system 540 is configured to avoid having a height (HC1) of the first connector 542 contribute to an overall height of the image capture device 500, that is, the height (HC1) of the first connector 542 is moved out of the height of the image capture device 500. Similarly, the second retention system 544 is configured to avoid having a height (HC2) of the second connector 546 contribute to the overall height of the image capture device 500. In other words, the first height (H1) of the first ISLA 534 is reduced by a height (HC1) of the first connector 542. The second height (H2) of the second ISLA 536 is reduced by a height (HC2) of the second connector 546. By removing the heights (HC1, HC2) of the first connector 542 and the second connector 546 from the heights (H1, H2) of the firsts ISLA 534 and the second ISLA 536, respectively, the heights (H1, H2) may be reduced by about 10 percent or more, about 15 percent or more, about 20 percent or more, or about 25 percent or more, respectively. By removing the heights (HC1, HC2) of the first connector 542 and the second connector 546 from the heights (H1, H2) of the firsts ISLA 534 and the second ISLA 536, respectively, the heights (H1, H2) may be reduced by about 50 percent or less, about 40 percent or less, about 30 percent or less, or about 27 percent or less, respectively.

Figure 5B:
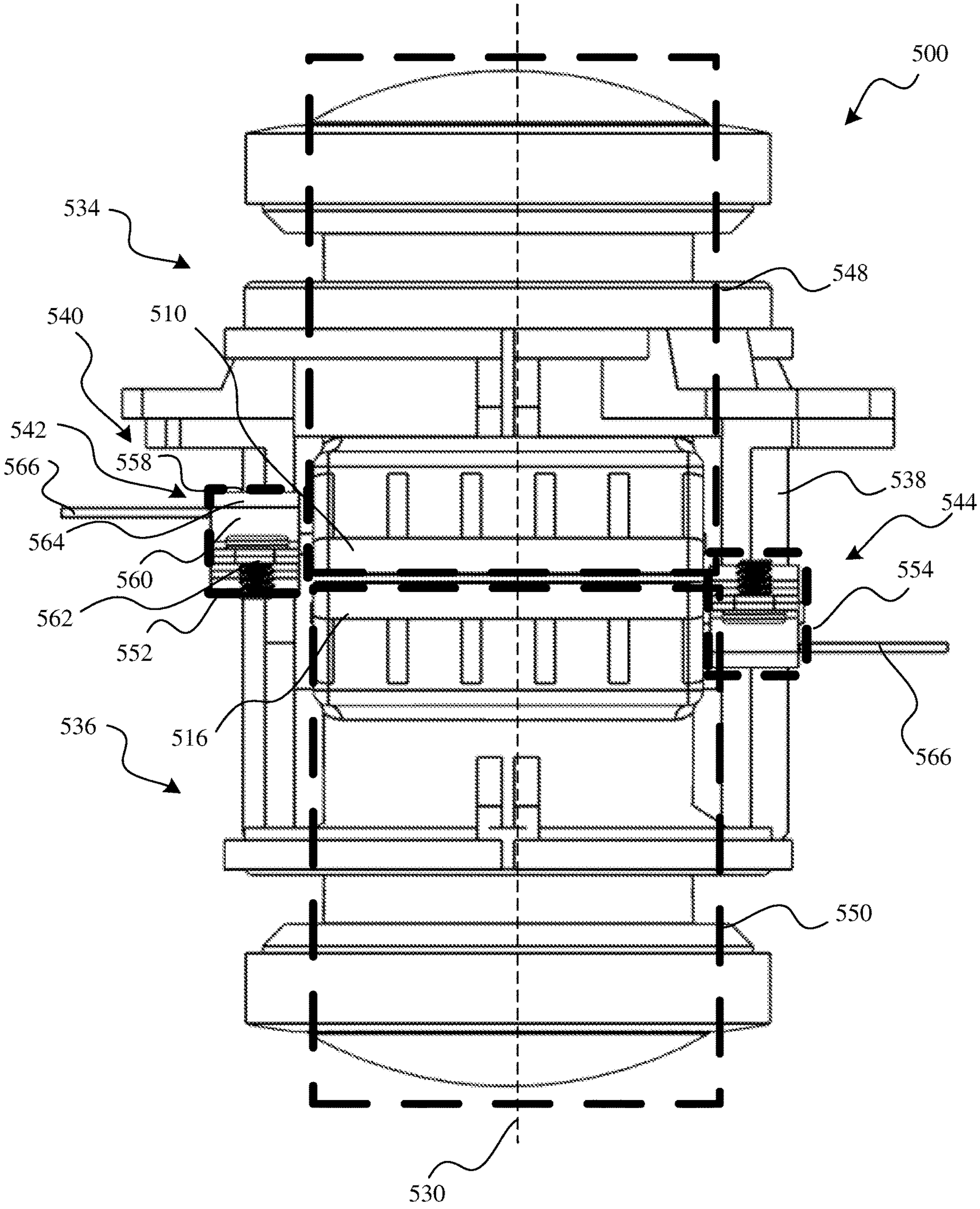
FIG. 5B is a plan view of a second side of the image capture device of FIG. 4.

FIG. 5B is a plan view of an opposite side of the image capture device 500 of FIG. 5A. The image capture device 500 includes the first ISLA 534 within a first stress-free zone 548 and the second ISLA 536 within a second stress-free zone 550. The first stress-free zone 548 and the second stress-free zone 550 ensure that the first ISLA 534 and the second ISLA 536 maintain proper alignment without imparting any forces against the first ISLA 534 or the second ISLA 536 along the optical axis 530. The stress-free zones 548 and 550 decouple the first ISLA 534 and the second ISLA 536 relative to one another. The stress-free zones 548 and 550 retain the first ISLA 534 and the second ISLA 536 relative to one another while being free of any compression relative to one another. The lens mount 538 assists in forming the stress-free zones 548 and 550. The lens mount 538 restricts movement of the first image sensor 510 relative to the second image sensor 516 without exerting any forces (e.g., stress) on the image sensors 510 and 516. The stress-free zones 548 and 550 (e.g., formed within the lens mount 538) retain the first ISLA 534 and the second ISLA 536 even during a force event (e.g., dropping, banging, or bouncing). The stress-free zones 548 and 550 assist in maintaining a distance between the first image sensor 510 and the second image sensor 516. A first connection zone 552 and a second connection zone 554 are located outside of the first stress-free zone 548, the second stress-free zone 550, and the lens mount 538. The first connection zone 552 and the second connection zone 554 being moved outside of the lens mount 538 so that stresses and forces are located outside of the first stress-free zone 548 and the second stress-free zone 550 and are located within the first connection zone 552 and the second connection zone 554.

The first connection zone 552 and the second connection zone 554 may be substantially identical. The first connection zone 552 has a narrow bracket 558 and a wide bracket 560 that connect the first connector 542 to a flexible connector 564 of a flexible member 566. The narrow bracket 558 and the wide bracket 560 are connected by fasteners 562 that creates a force that retains the first connector 542 and the flexible connector 564 in a connected state. The first connection zone 552 creates a force parallel to the optical axis 530 (e.g., laterally offset from the optical axis). For example, the forces extend in a direction parallel to the optical axis 530 but the optical axis 530 does not extend through the first connection zone 552, the second connection zone 554, or both. The first connection zone 552 prevents the flexible connector 564 and the flexible member 566 from disconnecting due to a force event as discussed herein. The first connection zone 552 removes forces from the between the first ISLA 534 and the second ISLA 536 so that the region along the optical axis 530 is the first stress-free zone 548 and the second stress-free zone 550. The second connection zone 554 may be identical to the first connection zone 552 and create forces on a second set of connection elements.

The first connection zone 552 and the second connection zone 554 are located outside of the first stress-free zone 548 and the second stress-free zone 550, respectively. The first connection zone 552, the second connection zone 554, or both may be located outside of an optical region, a footprint of the image sensor, a footprint of the lenses, or a combination thereof. The first connection zone 552 and the second connection zone 554 may be located on opposite sides of the optical axis 530. The first connection zone 552 and the second connection zone 554 may remove forces along the optical axis 530 so that stresses are removed from the first ISLA 534 and the second ISLA 536. The first connection zone 552, the second connection zone 554, or both may provide a secure connection while allowing the first ISLA 534 and the second ISLA 536 to form a secured connection so that the flexible member 466 may transfer data within the image capture device 500. The first connection zone 552 may greate a force that connects the first connector 542 to the flexible connector 564 and the second connection zone 554 may create a force to connect connectors therein.

The flexible member 566 may be a cable, a wire, a flexible wire, coated wires joined together, or a combination thereof that provide power, signals, or both. The flexible member 566 may move within an image capture device 500 between two components. The flexible member 566 may include one or more wires, two or more wires, three or more wires, ten or less wires, or seven or less wires. The flexible member 566 that connects to the first ISLA 534 and the second ISLA 536 may be substantially identical.

Figure 5C:
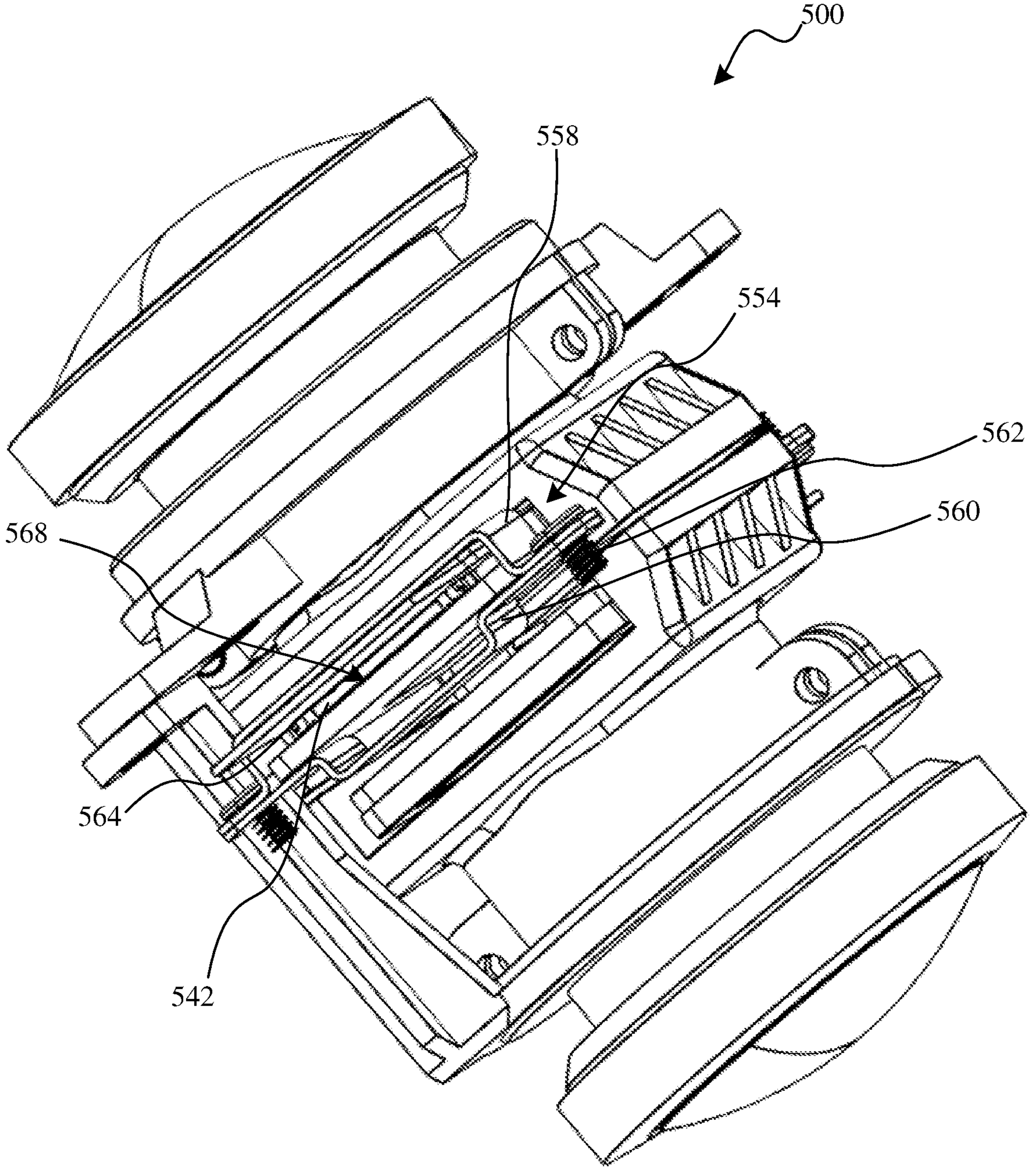
FIG. 5C is an isometric view of back-to-back ISLA modules and a retention system.

FIG. 5C is an isometric view of the second connection zone 554 of the image capture device 500 of FIGS. 4-5B. The second connection zone 554 includes a narrow bracket 558 and a wide bracket 560 connected by the fasteners 562. The fasteners 562 are any member that connects the narrow bracket 558 and the wide bracket 560 together. The fasteners 562 may adjust an amount of created between the narrow bracket 558 and the wide bracket 560. The fasteners 562 may provide a variable amount of force on a connection region 568. Based on a position of the fasteners 562, an amount of force may be increased or decreased by moving the narrow bracket 558 and the wide bracket 560 relative to one another. The fasteners 562 may be a threaded member, a spring, a screw, a nut and bolt, a ratchet member, or a combination thereof. The fasteners 562 are adjustable to create a variable amount of force with the connection zone 554. The connection region 568 may be located between the narrow bracket 558 and the wide bracket 560. The connection region 568 may house the flexible connector 564 and the first connector 542.

The flexible connector 564 and the first connector 542 form an electrical connection therebetween. The flexible connector 564 and the first connector 542 are retained within the connection region 568 and maintained in contact by the force created by the fasteners 562. The flexible connector 564 and the first connector 542 may be prevented from separating due to a force event experienced by the image capture device 500. Any force experienced in the connection region 568 may be isolated to occur at a location of the first connector 542 and the flexible connector 564.

Figure 5D:
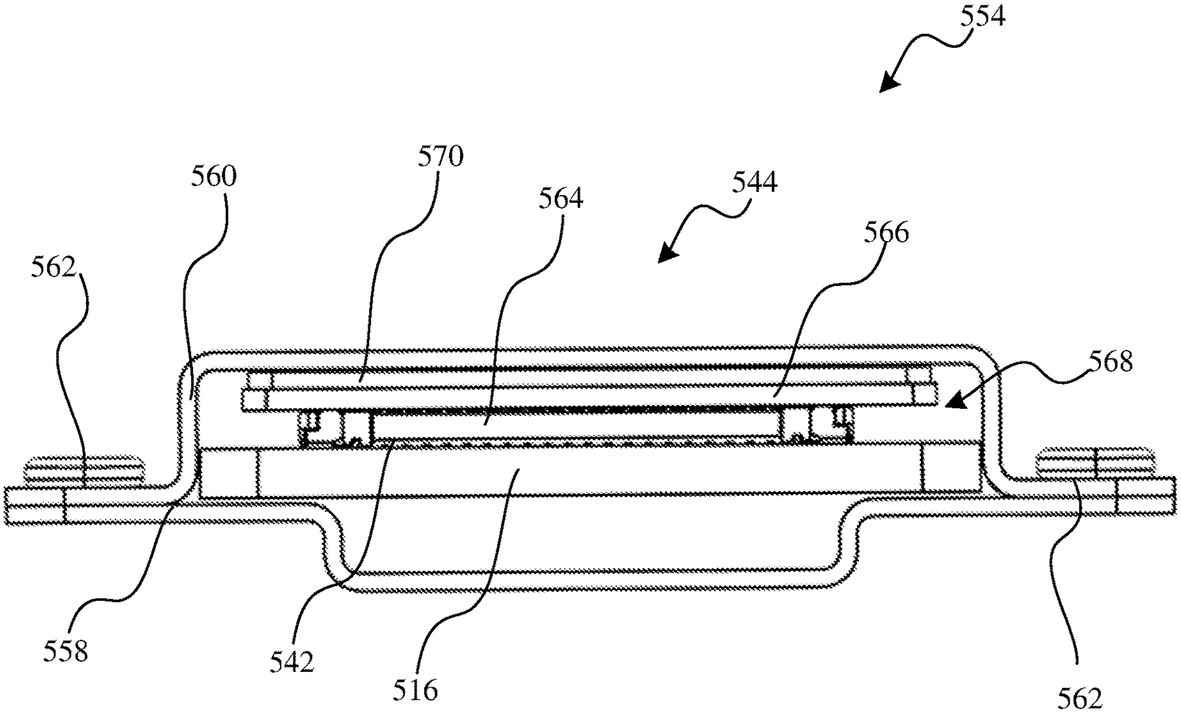
FIG. 5D is a close-up plan view of the retention system of FIG. 5C.

FIG. 5D is a close-up view of the second connection zone 554 of FIG. 5C. In the second connection zone 554, the second retention system 544 includes a narrow bracket 558 and a wide bracket 560 connected by the fasteners 562. The connection region 568 is formed between the narrow bracket 558 and the wide bracket 560. The connection region 568 includes the second image sensor 516 at a bottom with the first connector 542 located thereon. The first connector 542 is connected to a flexible connector 564 located on a flexible member 566. A compliant member 570 is located between the flexible member 566 and the wide bracket 560.

The compliant member 570 may isolated or otherwise relieve stress experienced by the first connector 542 and the flexible connector 564. The compliant member 570 may flex about 1 percent or more, about 3 percent or more, about 5 percent or more, about 50 percent or less, about 30 percent or less, or about 10 percent or less. The compliant member 570 may be made of or include rubber, an elastomer, felt, a thermally conductive material, a thermally insulative material, foam, an open celled foam, a closed cell foam, or combination thereof. The compliant member 570 may permit some movement of the components within the connection region 568 while maintaining a connection between the first connector 542 and the flexible connector 564. The compliant member 570 may absorb shock during a force event. The compliant member 570 may prevent damage to the first connector 542 and the flexible connector 564 by absorbing forces.

Figure 6:
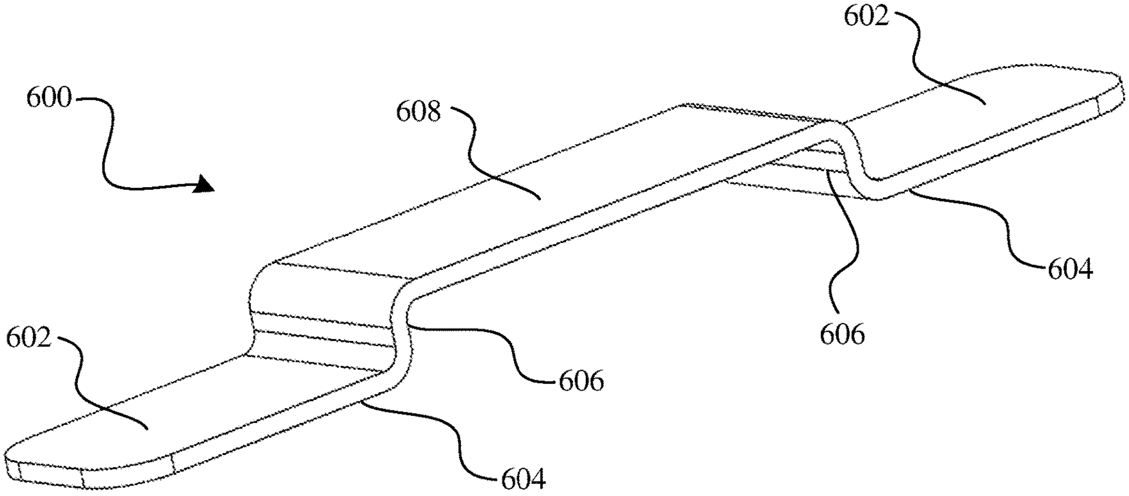
FIG. 6 is a close-up isometric view of a narrow bracket of FIG. 5D.

FIG. 6 is an isometric view of a narrow bracket 600. The narrow bracket 600 includes connection regions 602 (e.g., narrow connection regions). The connection regions 602 have contact surfaces 604. The contact surfaces 604 terminate at a step 606. The step 606 extends outward forming a non-contact surface and/or region 608.

The connection region 602 is connected by fasteners (not shown) that form the connection discussed in FIG. 5D. The connection region 602 may include holes or be free of holes. The connection region 602 may include a female portion that receives male fastener. The connection region 602 may hold the contact surface 604 in communication with a component of the image capture device.

The contact surface 604 may contact an image sensor (e.g., 510, 516). The contact surface 604 may contact edges or sides proximate to the edges of a component. The contact surfaces 604 when in contact may provide a force to a component so that movement of the component is restricted. The contact surfaces 604 and the connection region 602 may be coplanar, parallel, adjacent, or both. The contact surfaces 604 may terminate at one or more steps 606.

The one or more steps 606 function to curve away from the contact surfaces 604, the connection regions 602, or both. The steps 606 may be two opposing steps. The steps 606 may move a portion of the narrow bracket outward. The steps 606 may prevent contact between a component and a portion of the narrow bracket 600. The steps 606 may move a non-contact surface and/or region 608 that extends away from the component of the image capture device 500.

The non-contact surfaces and/or region 608 may be free of contact with a component. The non-contact surfaces and/or region 608 may be free of contact with the component (e.g., an image sensor (510, 516)). The non-contact surfaces and/or region 608 may be an area of the narrow bracket 600 that aligns with a sensor portion of the image sensor 510, 516 that receives light, is located along the optical axis, or both. The non-contact surfaces and/or region 608 may prevent forces from being applied to delicate regions of the image sensor 510, 516. The narrow bracket 600 may always be in contact with the image sensor 510, 516 regarding of the orientation of the image sensors 510, 516.

Figure 7:
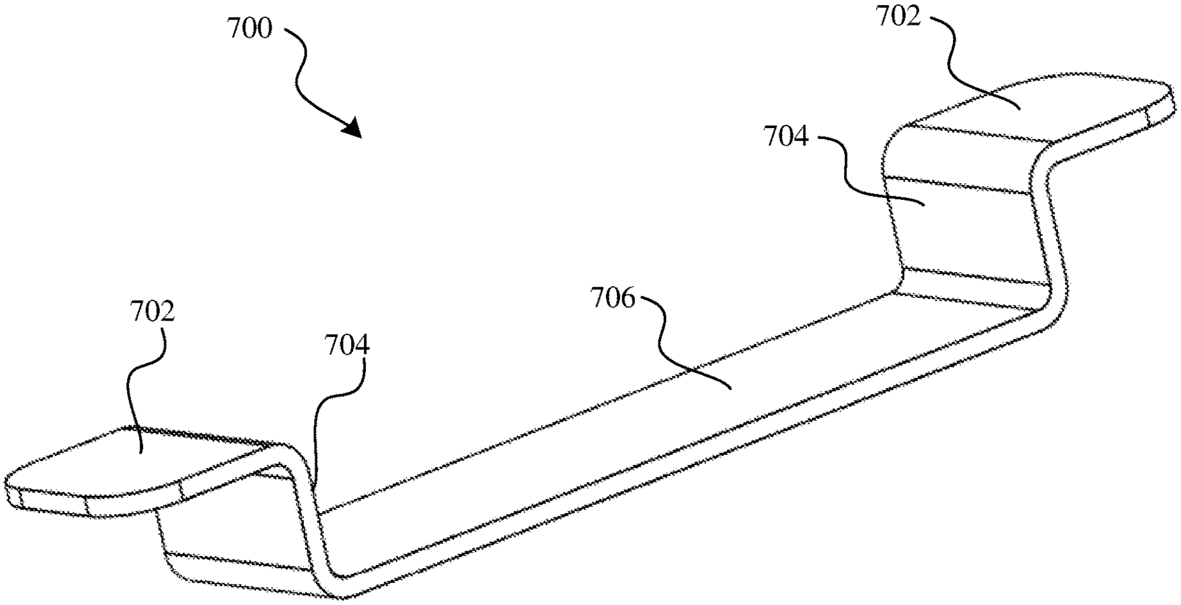
FIG. 7 is a close-up isometric view of a wide bracket of FIG. 5D.

FIG. 7 is an isometric view of a wide bracket 700. The wide bracket 700 includes connection regions 702 (e.g., wide connection regions), steps 704, and contact regions 706. The wide bracket 700 extends around components of the image capture device 500 such that the components are retained between the wide bracket 700 and the narrow bracket 600 of FIG. 6. The wide bracket 700 may be located on a top side or a bottom side of the components (e.g., above the narrow bracket 600 or below the narrow bracket 600). The wide bracket 700 may be half of the first retention system 540 and the second retention system 544 of FIGS. 5B-5C. The wide bracket 700 only contacts the narrow bracket 600 at the connection regions 702.

The connection regions 702 may be the only portions of the wide bracket 700 that contact the connection regions 602 of the narrow bracket 600 of FIG. 6. The connection regions 702 of the wide bracket 700 may be identical to or include features of the connection regions 702 of the narrow bracket 600. The connection regions 702 may be coplanar with one another. For example, the wide bracket 700 may include two connection regions 702 that at opposing ends of the wide bracket 700. The connection regions 702 may be solid, a hole, a through hole, a threaded hole, or a combination thereof such that the connection regions 702 are connectable with a fasteners 562 such as shown in FIG. 5B. The connection regions 702 may assist in providing a force to the components in contact with the wide bracket 700. The connection regions 702 may terminate at one or more steps 704.

The steps 704 change a direction of the wide bracket 700 relative to the connection regions 702. The steps 704 change direction to accommodate a size and shape of the components such as the image sensors 510 or 516, first connector 542, flexible connector 564, flexible member 566, compliant member 570, or a combination thereof of FIGS. 5B-5C. The steps 704 may be sufficiently long so that the one or more components may fit within and/or between the steps 704 and a force be applied to the one or more components located within and/or between the steps 704. The steps 704 may terminate at a contact region 706.

The contact region 706 may be the region of the wide bracket 700 that contacts the one or more components (e.g., the image sensors 510 or 516, first connector 542, flexible connector 564, flexible member 566, compliant member 570, or a combination thereof of FIGS. 5B-5C). The contact region 706 may extend parallel to two connection regions 702. The contact region 706 may be located between two opposing steps 704. The contact region 706 may have a length that is substantially a same as a length of the one or more components discussed herein. The contact regions 706 may extend along one of the components and be in contact with the component so that a force may be applied to the one or more components when the wide bracket 700 and the narrow bracket 600 are connected together by the fasteners 562 such as is shown in FIG. 5B. The contact region 706 is substantially rigid so that the contact region 706 is free of flexing while applying the force. The contact region 706 may substantially retain its shape when the force is applied. The contact region 706 of the wide bracket 700 has a length that is greater than a length of a non-contact region 608 of the narrow bracket 600. The fasteners 562 are movable to generate a variable amount of force within the first retention system 540.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An image capture device comprising:

a first lens assembly having a first area;

a first image sensor in communication with the first lens assembly forming a first integrated sensor and lens assembly (a first ISLA), the first ISLA facing in a first direction;

a first connector located on the first image sensor that extends outside of the first area;

a first flexible member comprising a first flexible connector that aligns with the first connector so to form a connection between the first connector and the first flexible member to connect the first ISLA within the image capture device;

a second lens assembly having a second area;

a second image sensor in communication with the second lens assembly forming a second integrated sensor and lens assembly (a second ISLA), the second ISLA facing in a second direction that is opposite the first direction;

a second connector located on the second image sensor that extends outside of the second area;

a second flexible member comprising a second flexible connector that aligns with the second connector to form a connection between the second connector and the second flexible connector to connect the second ISLA to the image capture device;

a first retention system that extends around the first connector of the first image sensor that extends outside of the first area of the first lens assembly and the first flexible connector so that the first retention system maintains the connection between the first connector and the first flexible connector; and a second retention system that extends around the second connector of the second image sensor that extends outside of the second area of the second lens assembly and the second flexible connector so that the second retention system maintains the connection between the second connector and the second flexible connector.

2. The image capture device of claim 1, wherein the first retention system and the second retention system respectively comprise: a narrow bracket and a wide bracket.

3. The image capture device of claim 2, wherein the wide bracket comprises:

connection regions;

a step connected to the connection regions; and a contact region located between the connection regions and the steps.

4. The image capture device of claim 2, wherein the narrow bracket comprises:

connection regions;

contact surfaces adjacent to the connection regions;

a step located adjacent to the connection regions, the contact surfaces, or both; and a non-contact surface located between the steps.

5. The image capture device of claim 2, further comprising:

a compliant member located within the first retention system and a second compliant member located within the second retention system.

6. The image capture device of claim 1, further comprising:

a first compliant member in communication with the first connector or the first flexible member.

7. The image capture device of claim 1, further comprising:

a first compliant member in communication with the second connector or the second flexible member.

8. An image capture device comprising:

a first lens assembly;

a first image sensor in communication with the first lens assembly forming a first integrated sensor and lens assembly (a first ISLA), the first ISLA facing in a first direction;

a first connector of the first image sensor;

a first flexible connector;

a first retention system that extends around the first connector and the first flexible connector, wherein the first retention system includes a wide bracket and a narrow bracket;

a second lens assembly;

a second image sensor in communication with the second lens assembly forming a second integrated sensor and lens assembly (a second ISLA), the second ISLA facing in a second direction that is opposite the first direction;

a second connector of the second image sensor;

a second flexible connector; and a second retention system that extends around the second connector and the second flexible connector.

9. The image capture device of claim 8, wherein the first image sensor comprising the first connector extends in a first lateral direction and the second image sensor comprising the second connector extends in a second lateral direction that is opposite the first lateral direction relative to an optical axis of the first ISLA and the second ISLA.

10. The image capture device of claim 8, wherein the wide bracket is a first wide bracket and the narrow bracket is a first narrow bracket, wherein the second retention system includes a second wide bracket and a second narrow bracket, and wherein a contact region of the second wide bracket has a length that is greater than a length of a non-contact region of the second narrow bracket.

11. The image capture device of claim 8, further comprising:

a first compliant member located within the first retention system.

12. The image capture device of claim 8, further comprising:

a second compliant member located within the second retention system.

13. An image capture device comprising:

a first lens assembly;

a first image sensor in communication with the first lens assembly forming a first integrated sensor and lens assembly (a first ISLA), the first ISLA facing in a first direction;

a second lens assembly;

a second image sensor in communication with the second lens assembly forming a second integrated sensor and lens assembly (a second ISLA), the second ISLA facing in a second direction that is opposite the first direction;

a lens mount that connects the first ISLA and the second ISLA together forming one or more stress-free zones;

a first connector of the first image sensor;

a first flexible connector;

a first retention system that connects the first connector and the first flexible connector in a first connection zone, wherein the first retention system comprises a narrow bracket and a wide bracket;

a second connector of the second image sensor;

a second flexible connector; and a second retention system that connects the second connector and the second flexible connector in a second connection zone.

14. The image capture device of claim 13, wherein the first connection zone and the second connection zone are located outside of the one or more stress-free zones.

15. The image capture device of claim 13, wherein the first connection zone is zone where the first retention system is configured to generate a force that retains the first connector and the first flexible connector in communication.

16. The image capture device of claim 13, wherein the second connection zone is a zone where the second retention system is configured to generate a force that retains the second connector and the second flexible connector in communication.

17. The image capture device of claim 13, wherein the narrow bracket comprises narrow connection regions, and wherein the wide bracket comprises wide connection regions that are located adjacent to the narrow connection regions to form the first retention system.

18. The image capture device of claim 17, further comprising:

fasteners that extend through the narrow connection regions and the wide connection regions to connect the narrow bracket to the wide bracket, wherein the fasteners are movable to generate a variable amount of force within the first retention system.

19. The image capture device of claim 8, wherein the first ISLA and the second ISLA are back-to-back and are co-axial along an optical axis.

20. The image capture device of claim 13, wherein the first connector extends out of a first side of the lens mount, wherein the second connector extends out of a second side of the lens mount, and wherein the first side and the second side are opposite to one another with respect to an optical axis of the first ISLA and the second ISLA.

* * * * *